(12) United States Patent
Jangam et al.

(10) Patent No.: US 11,845,128 B2
(45) Date of Patent: Dec. 19, 2023

(54) POWDER BED MATERIALS

(71) Applicant: HEWLETT-PACKARD DEVELOPMENT COMPANY, L.P., Spring, TX (US)

(72) Inventors: John Samuel Dilip Jangam, Palo Alto, CA (US); Thomas Anthony, Palo Alto, CA (US); Krzysztof Nauka, Palo Alto, CA (US); Kristopher J. Erickson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,423

(22) PCT Filed: Jun. 8, 2018

(86) PCT No.: PCT/US2018/036615
§ 371 (c)(1),
(2) Date: Oct. 15, 2019

(87) PCT Pub. No.: WO2019/236100
PCT Pub. Date: Dec. 12, 2019

(65) Prior Publication Data
US 2021/0331235 A1   Oct. 28, 2021

(51) Int. Cl.
*B33Y 70/10* (2020.01)
*B22F 9/04* (2006.01)
(Continued)

(52) U.S. Cl.
CPC .............. *B22F 10/14* (2021.01); *B22F 1/05* (2022.01); *B22F 1/142* (2022.01); *B22F 9/04* (2013.01);
(Continued)

(58) Field of Classification Search
CPC .................... B22F 1/05; B22F 2009/0043
See application file for complete search history.

(56) References Cited

U.S. PATENT DOCUMENTS

| 5,431,967 A | 7/1995 | Manthiram et al. |
| 7,172,790 B2 | 2/2007 | Koulik et al. |
| (Continued) | | |

FOREIGN PATENT DOCUMENTS

| CN | 103769586 A | 5/2014 |
| CN | 105463252 A | 4/2016 |
| (Continued) | | |

OTHER PUBLICATIONS

Ameyama et al. "Creation of Harmonic Structure Materials with Outstanding Mechanical Properties" Materials Science Forum, vol. 706-709, Jan. 1, 2012, pp. 9-16 (Year: 2012).*
(Continued)

*Primary Examiner* — Jophy S. Koshy
*Assistant Examiner* — Joshua S Carpenter
(74) *Attorney, Agent, or Firm* — HP Inc. Patent Department

(57) ABSTRACT

A powder bed material can include from 80 wt % to 100 wt % metal particles having a D50 particle size distribution value from 4 μm to 150 μm. From 10 wt % to 100 wt % of the metal particles can be surface-activated metal particles having in intact inner volume and an outer volume with structural defects. The structural defects can exhibit an average surface grain density of 50,000 to 5,000,000 per $mm^2$.

19 Claims, 5 Drawing Sheets

(51) Int. Cl.
B22F 1/05 (2022.01)
B22F 1/142 (2022.01)
B33Y 70/00 (2020.01)
B22F 10/14 (2021.01)
B33Y 10/00 (2015.01)
B29C 64/165 (2017.01)

(52) U.S. Cl.
CPC .............. B33Y 10/00 (2014.12); B33Y 70/00 (2014.12); B33Y 70/10 (2020.01); *B22F 2009/043* (2013.01); *B22F 2304/10* (2013.01); *B29C 64/165* (2017.08)

(56) References Cited

U.S. PATENT DOCUMENTS

| | | | |
|---|---|---|---|
| 9,004,985 | B2 | 4/2015 | Jiang |
| 9,512,544 | B2 | 12/2016 | Heikkila |
| 2004/0238345 | A1 | 12/2004 | Koulik et al. |

FOREIGN PATENT DOCUMENTS

| | | | | |
|---|---|---|---|---|
| CN | 106756240 | A | * | 5/2017 |
| CN | 106825568 | A | | 6/2017 |
| EP | 1831432 | B1 | | 2/2015 |
| EP | 3047925 | | | 7/2016 |
| EP | 3127684 | A1 | | 2/2017 |
| RU | 2612480 | C1 | | 3/2017 |
| WO | WO2011101001 | A1 | | 8/2011 |
| WO | WO2013024297 | A1 | | 2/2013 |
| WO | WO-2016152023 | | | 9/2016 |
| WO | WO2018017130 | A1 | | 1/2018 |
| WO | WO-2018071578 | A1 | * | 4/2018 ........... B29C 64/153 |

OTHER PUBLICATIONS

Espacenet machine translation of CN-106756240-A retrieved on Aug. 8, 2022 (Year: 2017).*

Zhang, Zhe, et al. "Importance of bimodal structure topology in the control of mechanical properties of a stainless steel." Advanced Engineering Materials 17.6 (2015): 791-795. (Year: 2015).*

Ahmad Basalah et al.; Characterizations of additive manufactured porous titanium implants.

Kei Ameyama and Hiroshi Fujiwara; Creation of Harmonic Structure Materials With Outstanding Mechanical Properties; Materials Science Forum vols. 706-709 (2012) pp. 9-16.

Malvern: "A basic guide to particle characterization". Dec. 31, 2015 (Dec. 31, 2015).

Renliang Xu et al: "Comparison of sizing small particles using different technologies", Powder Technology, Elsevier, Basel (CH), vol. 132, No. 2-3, Jun. 24, 2003 (Jun. 24, 2003), pp. 145-153.

Zhang Yi et al: Additive Manufacturing of Metalic Materials: A Review, Journal of Materials Engineering and Performance, ASM International Materials Park, OH, U3, vol. 27, No. 1, May 24, 2017 (May 24, 2017), pp. 1-13.

* cited by examiner

POWDER BED MATERIALS

BACKGROUND

Three-dimensional printing, sometimes referred to as 3D printing, can be used for rapid prototyping and/or additive manufacturing (AM), and can involve computer-controlled processes by which a printer transforms materials into a three-dimensional physical object. Methods of 3D printing have continued to develop over the last few decades and include, but are not limited to selective laser sintering, selective laser melting, electron beam melting, stereolithography, fused deposit modeling, as well as others. The demand for new techniques and materials for 3D printing continues to increase as applicable areas of use likewise continue to expand and evolve.

DETAILED DESCRIPTION

Figure 1:
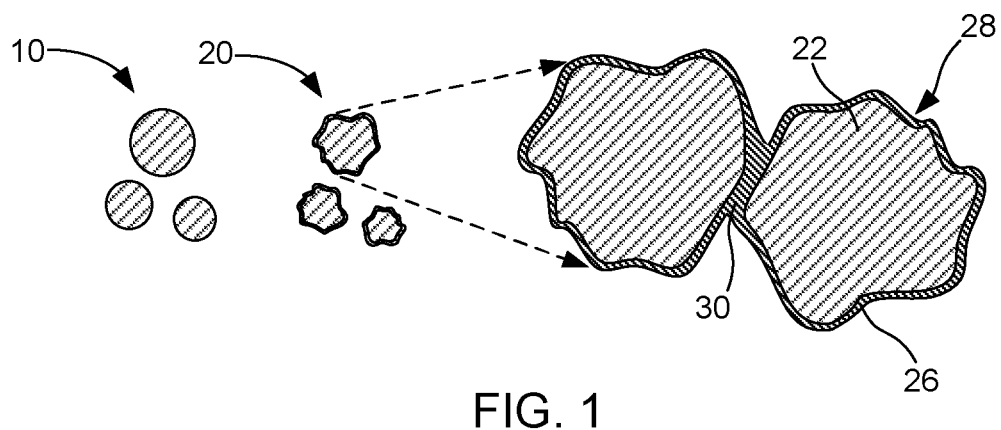
FIG. 1 schematically depicts an example cross-sectional view of metal particles before and after structural defects are introduced to an outer volume thereof, e.g., surface activation, as well as a connection bridge that can be formed between two adjacent metal particles below the melting temperature of the metal particles in accordance with the present disclosure.

In accordance with the present disclosure, three-dimensional printing of metal articles can involve heating metal powder in order to sinter or melt metal particles to form a fused article. In further detail, three-dimensional printing can be carried out using metal particles of a powder bed material and selectively printing or ejecting a binder fluid onto portions of the powder bed material in a layer by layer manner, e.g., spreading powder bed material followed by applying binder fluid and repeating, to form a green part. The green part or object can then be sintered or annealed to form the final metal part, e.g., the green object moved to an oven (or remains in place) to be heat fused. Particularly in examples where the binder fluid carries a binder polymer, such as latex particles or some other type of polymer or polymerizable material, the polymer can burn off, e.g., burnout, at a relatively low temperature during the sintering or annealing process. Thus, if metal particle sintering does not begin to occur near this relatively low temperature where the binder is burned off or becomes otherwise ineffective or decomposed, there may be a temperature gap (and thus a time gap) between the time at which the polymer becomes ineffective and sintering of the metal particles together begins. This can lead to the collapse or partial collapse of parts, particularly in the case of metal particles with particularly high sintering temperatures, e.g., Fe, Ni, Cu, Ti alloys, etc., which sinter at temperatures above 1000° C., for example. Furthermore, even when using metal nanoparticle, metal salt, or metal oxide nanoparticle binders rather than polymer binders that may be devoid of polymer or include only small amounts of polymer, there can be a temperature range where binding strength may be insufficient to maintain a desired shape of printed object due to insufficient density of binding contact between the powder particles or excessive thermal stresses associated with the presence of binding material.

In the present disclosure, powder bed material that can be used can include metal particles that are surface activated by the introduction of structural defects to an outer volume thereof. This "activation" can have the effect of allowing sintering and/or the formation of connection bridges between adjacent or touching metal particles at temperatures below the melting temperature of the metal particle material. For example, without being limiting, stainless-steel can be sintered and adjacent metal particles fused together to form connection bridges at a temperature of about 1000° C. for 30 minutes, even though the melting temperature for stainless-steel is about 1550° C. Thus, surface activation of a metal particle can often generate a lower heat fusing temperature (or melting temperature) at the surface of the metal particles compared to the same metal particles that have not been surface-treated. This can reduce or eliminate the temperature gap between when the polymer binder becomes ineffective and the metal particles begin to sinter together. Likewise, if using a thermally sensitive metal nanoparticle, metal salt, or metal oxide binder/reducing agent systems as the binder fluid rather than a polymer binder, surface activation can also improve binding strength in some instances, as binding between metal particles may be more likely to occur due to the easier path for atomic diffusion that may be present at the respective surfaces.

In accordance with this, the present disclosure is drawn to a powder bed material, including 80 wt % to 100 wt % metal particles having a D50 particle size distribution value from 4 μm to 150 μm. From 10 wt % to 100 wt % of the metal particles can be surface-activated metal particles having an intact inner volume and an outer volume with structural defects. The structural defects can exhibit an average surface grain density of 50,000 to 5,000,000 per $mm^2$. In further detail, the metal particles can be elemental metals or alloys of aluminum, titanium, copper, cobalt, chromium, nickel, vanadium, tungsten, tungsten carbide, tantalum, molybdenum, magnesium, gold, silver, iron, stainless-steel, steel, or an admixture thereof. The structural defects can be introduced by ball milling, also referred to herein as "bead milling" or simply "milling." For example, the structural defects can be introduced by milling with 50 μm to 500 μm milling beads harder than the metal particles suspended in an aliphatic oil at a milling speed of 400 RPM to 1000 RPM for 10 minutes to 24 hours. For example, structural defects introduced by milling can exhibit an average surface grain density of 80,000 mm² to 2,000,000 per mm². An alternative method for introducing the surface defects is by flash heating with a high intensity photon source, such as a xenon flash lamp or pulsed laser. In an example, the structural defects can alternatively be introduced by flash heating the metal particles with from 1 to 10 pulses of light energy from a xenon lamp at from 15 J/cm² to 50 J/cm². For example, structural defects introduced by flash heating can exhibit an average surface grain density of 60,000 mm² to 120,000 per mm², among other levels of structural defects outside of this more specific range.

In another example, a material set can include a powder bed material, including 80 wt % to 100 wt % metal particles having a D50 particle size distribution value from 4 µm to 150 µm. From 10 wt % to 100 wt % of the metal particles can be surface-activated metal particles having an intact inner volume and an outer volume with structural defects. The structural defects can exhibit an average surface grain density of 50,000 to 5,000,000 per mm². The material set can also include a binder fluid to provide particle adhesion to a first portion of the powder bed material relative to a second portion of the powder bed material not in contact with the fluid. In one example, the binder fluid can include a polymer binder or a polymerizable binder. In another example, the binder fluid can be stable at room temperature, and can include water, dispersed metal oxide nanoparticles, and a reducing agent to reduce the dispersed metal oxide nanoparticles when heat is applied to the binder fluid. In another example, the binder fluid can include metal nanoparticles or a metal salt. The metal particles can be elemental metals or alloys of aluminum, titanium, copper, cobalt, chromium, nickel, vanadium, tungsten, tungsten carbide, tantalum, molybdenum, magnesium, gold, silver, iron, stainless-steel, steel, or an admixture thereof. The structural defects can be introduced by ball milling with 50 µm to 500 µm milling beads harder than the metal particles while suspended in an aliphatic oil at a milling speed of 400 RPM to 1000 RPM for 10 minutes to 24 hours. In another example, the structural defects can be introduced by flash heating the metal particles with from 1 to 10 pulses of light energy at from 15 J/cm² to 50 J/cm². In one example, the average surface grain density can be from 80,000 mm² to 2,000,000 per mm².

In another example, a method of three-dimensional printing can include spreading a powder bed material to form a powder layer having a thickness of from 20 µm to 400 µm, wherein the powder bed material includes 80 wt % to 100 wt % metal particles having a D50 particle size distribution value from 4 µm to 150 µm. From 10 wt % to 100 wt % of the metal particles can be surface-activated metal particles having an intact inner volume and an outer volume with structural defects. The structural defects can exhibit an average surface grain density of 50,000 to 5,000,000 per mm². The method can also include selectively binding a first portion of the powder bed material to form a green layer within the powder, and can further include building up additional green layers by sequentially repeating the spreading and the selectively binding of the powder bed material until a green three-dimensional object is formed. In one example, the method can include heat fusing the green three-dimensional object to sinter or anneal the metal particles together. In another example, the heat fusing can start at a temperature from 0.6 to 0.8 of the melting temperature of the metal particles.

It is noted that when discussing the powder bed materials, the material sets, or the methods of three-dimensional printing, each of these discussions can be considered applicable to other examples whether or not they are explicitly discussed in the context of that example. Thus, for example, in discussing a metal particle related to the material sets, such disclosure is also relevant to and directly supported in context of the methods or the powder bed material, and vice versa.

In certain examples of the present disclosure, not all of the metal particles of the powder bed material are surface-modified metal particles with an increased number of structural defects, including measurable surface grains. These surface-activated metal particles can be admixed with virgin metal particles. Thus, though 80 wt % to 100 wt % of the powder bed material can be metal particles, from 10 wt % to 100 wt % (or all) of the metal particles of the powder bed material are surface-modified. In other examples, however, all of the metal particles present in the powder bed material can be surface-activated metal particles. By treating some or all of the metal particles to activate the surface thereof as described herein, part browning and/or connection bridges between particles can occur at lower temperatures, ameliorating part failures that may otherwise occur with some metals, e.g., sinter can occur well below the sintering temperature of the untreated material.

When referring to the outer volume of the metal particles, the terms "activate," "activation," "activated," "surface-activated," or the like refers to metal particles that have been treated to introduce any of a number of large spectrum of structural defects, such as dislocations, inclusions, voids, precipitations, point defect (interstitials and vacancies), etc.

"Surface grain density" or "average surface grain density" refers to one way of verifying the presence of structural defects that may be present in a metal particle. Many virgin metal particles exhibit an average surface grain density of up to about 20,000 per mm². In accordance with the present disclosure, the average surface grain density of the metal particles can be from 50,000 per mm² to 5,000,000 per mm², from 60,000 per mm² to 2,000,000 per mm², from 60,000 per mm² to 120,000 per mm², from 80,0000 per mm² to 2,000,000 per mm², from 80,000 per mm² to 100,000 per mm² to 2,000,000 per mm², etc. The average surface grain density can be measured and calculated by counting the number of grains visible on the outermost surface of the metal particles, averaged over a number of random metal particles sufficient to arrive at a reliable value. The larger the sample, typically, the more accurate the average. In one example, 10 randomly selected metal particles can be used, or more accurately, 100 randomly selected metal particles, or even more metal particles can be used. In accordance with the present disclosure, metal particle surface activation can be confirmed by measuring and calculating average surface grain density, even though the other types of structural defects may also be present. With metal particle samples with both virgin metal particles and surface-activated metal particles, the average surface grain density for "activated" particles can be counted based on individual grains where grains with 20,000 grains or less are considered virgin metal particles, and metal particles with greater than 20,000 grains can be counted as surface-modified metal particles for purposes of averaging relative amounts (of the two types of metal particles) and the average surface grain density within each type of metal particle, e.g., virgin metal particles vs.

surface-activated metal particles. As a further note, crystalline grains on the surface of surface-activated particles can be observed, counted, and measured. They are clearly visible in the case of flash heating. In the case of ball milling, their size can be deduced from the observation of the sheared particle's surface (elongated sheared planes), and from the observation of grains in sintered particles.

As mentioned, the surface-modified metal particles can include an inner volume and an outer volume. The inner volume can remain intact and the outer volume can be surface modified. In one example, the maximum outer volume can have a depth (measured from a surface of the metal particles) of up to 5 µm for particles that are 20 µm or larger in diameter (or longest length for asymmetric particles). For particles less than 20 µm or larger, the depth of the outer volume (from the surface) can be reduced based on the diameter or size measurement of the metal particle. In one example, the outer volume depth may be no more than 50% compared to a total diameter or longest size measurement of the metal particle. For example, a 10 µm particle may have a 2.5 µm outer volume depth, with 2.5 µm outer volume depth on opposing sides of the metal particle and 5 µm diameter or length defining an inner volume therebetween.

Turning now to example details related to the powder bed material (which can be included as part of the material set), the powder bed material can include from 80 wt % to 100 wt % metal particles, from 90 wt % to 100 wt % metal particles, from 99 wt % to 100 wt % metal particles, or can be composed of all metal particles. If the powder bed material is not 100 wt % metal particles, then other material that may be present can include other metal particles, some virgin metal particles, metal particles of another type of metal, smaller metal particles, salts, filler material, or the like. The metal particles in the present disclosure can be of an elemental or alloy metal material with an activated surface, e.g., structural defects introduced to an outer volume thereof. The structural defects can provide more effective particle fusing at lower temperatures compared to particles without surface activation.

As mentioned, the metal particles can be, for example, aluminum, titanium, copper, cobalt, chromium, nickel, vanadium, tungsten, tungsten carbide, tantalum, molybdenum, magnesium, gold, silver, iron, stainless-steel, steel, alloys thereof, or admixtures thereof. In many examples, the metal particles can include a transition metal, but there are examples where the metal particle does not include a transition metal, such as in the case of aluminum. In other examples, the metal particles can be an alloy of multiple metals or can include a metalloid(s). To illustrate, the alloy may be steel or stainless-steel. Even though steel includes carbon, it is still considered to be metal alloy in accordance with examples of the present disclosure because of its metal-like properties and the presence of a significant portion of elemental metal. Other metal alloys that may include some carbon or small amounts of non-metal dopant, metalloid, impurities, etc., can also be considered to be a "metal" in accordance with the present disclosure as well. Examples of elements that can be included in metal alloys or blends include H, C, N, O, F, P, S, CI, Se, Br, I, At, noble gases (He, Ne, Ar, Kr, Xe, and/or Rn), etc. Metalloids that can be included in some examples include B, Si, Ge, As, Sb, etc. Examples of metal alloys that can be used as the metal particles, including their respective melting temperatures, include ferro-aluminum (1225-1275° C.), ferro-boron (1450-1550° C.), ferro-chromium (1350-1675° C.), ferro-manganese (1060-1225° C.), ferro-molybdenum/molybdic oxide (1665-1715° C.), ferro-niobium (1500-1550° C.), ferro-phosphorus (1250-1350° C.), ferro-silicon (1225-1325° C.), ferro-silicon-manganese (1130-1230° C.), ferro-silicon-magnesium (1210-1250° C.), ferro-silicon-zirconium (1250-1340° C.), ferrous sulfide (1150-1200° C.), ferro-titanium (1070-1480° C.), ferro-vanadium (1695-1770° C.), and ferro-tungsten (1650-2100° C.). The melting temperature ranges are exemplary and can be adjusted in some instances within these ranges based on relative metal weight ratios, grade of material, etc. With these examples provided, however, a "metal" can be an elemental metal or alloy that exhibits properties generally associated with metals in metallurgy, e.g., malleability, ductility, fusibility, mechanical strength, high melting temperature, high density, high heat and electrical conduction, sinterable, etc.

These metal particles can exhibit good flowability within the powder bed material. The shape type of the metal particles can be spherical, irregular spherical, rounded, semi-rounded, discoidal, angular, subangular, cubic, cylindrical, or any combination thereof, to name a few. In one example, the metal particles can include spherical particles, irregular spherical particles, rounded particles, or other particle shapes that have an aspect ratio from 1.5:1 to 1:1, from 1.2:1, or about 1:1. In some examples, the shape of the metal particles can be uniform or substantially uniform, which can allow for relatively uniform melting or sintering of the particulates after the three-dimensional green part or object is formed and then heat fused in a sintering or annealing oven, for example. That being stated, due to the processes used to activate or introduce defects to a surface of the metal particles, the shapes of the metal particles can be irregular, even if the aspect ratio may remain near 1:1, for example.

The particle size distribution can also vary. As used herein, particle size refers to the value of the diameter of spherical particles, or in particles that are not spherical, can refer to the longest dimension of that particle. The particle size can be presented as a Gaussian distribution or a Gaussian-like distribution (or normal or normal-like distribution). Gaussian-like distributions are distribution curves that may appear essentially Gaussian in their distribution curve shape, but which can be slightly skewed in one direction or the other (toward the smaller end or toward the larger end of the particle size distribution range). That being stated, an exemplary Gaussian distribution of the metal particles can be characterized generally using "D10," "D50," and "D90" particle size distribution values, where D10 refers to the particle size at the 10th percentile, D50 refers to the particle size at the 50th percentile, and D90 refers to the particle size at the 90th percentile size. For example, a D50 value of 25 µm means that 50% of the particles (by weight percent) have a particle size greater than 25 µm and 50% of the particles have a particle size less than 25 µm. A D10 value of 10 µm means that 10% of the particles are smaller than 10 µm and 90% are larger than 10 µm. A D90 value of 50 µm means that 90% of the particles are smaller than 50 µm and 10% are larger than 50 µm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can still be considered to be essentially referred to as "Gaussian" as used conventionally.

In accordance with this, in one example, the metal particles can have a D50 particle size distribution value ranging from 4 µm to 150 µm, 20 µm to 150 µm, from 20 µm to 100 µm, or from 30 µm to 80 µm, for example. In another example, the metal particles can have a D10 particle size distribution from 5 µm to 50 µm, or from 10 µm to 30 µm. In still further detail, the metal particles can have a D90 particle size distribution from 25 µm to 85 µm, or from 35 µm to 75 µm, for example.

The metal particles can be produced using any manufacturing method. However, in one example, the metal particles can be manufactured by a gas atomization process. During gas atomization, a molten metal is atomized by inert gas jets into fine metal droplets that cool while falling in an atomizing tower. Gas atomization can allow for the formation of mostly spherical particles. In another example, the metal particles can be manufactured by a liquid atomization process.

By way of example, FIG. 1 depicts various metal particles 10 in accordance with the present disclosure that can be surface-treated to form surface-activated metal particles 20 with structural defects 28. In further detail, two metal particles that are in close proximity, e.g., touching, can be heated to form a physical connection bridge 30 at a temperature often well below the melting temperature of the metal particles. The surface-activated metal particles can include an inner portion 22 that remains free of surface-introduced defects and an outer portion 26 that includes the structural defects 28, such as at a depth of up to about 5 µm.

In some examples, the powder bed material shown in FIG. 1 can be part of a material set and/or used in a method of printing three-dimensional objects. In either case, the material set and/or the method can utilize a binder fluid to bind the surface-activated metal particles together on a layer by layer basis. There are various ways that can be implemented to provide metal particles with increased number of grains in the outer volume of the metal particle. As a note, increased grain density can likewise be associated with other structural defects, such as dislocations, inclusions, voids, precipitations, point defects including vacancies and interstitials. Average surface grain density can be viewed as a measurable proxy for many of these defects that can contribute to connection bridge formation enhancement. With this in mind, it is noted that surface activation can be introduced to the metal particles by milling, flash heating, particle bombardment, e.g., neutron or proton irradiation, plasma treatment at the surface, etc. These approaches can disrupt or introduce defects to the surface of the metal particles. Rapid cooling (when approaches that add heat are used) can be used with various inert gases to quench the surface and enhance the surface activation.

With respect to milling processes, the milling can occur in a manner that is vigorous enough to provide the surface density of defects described herein without adversely impacting the integrity of the inner portion of the metal particles. For example, milling may occur using 50 µm to 500 µm milling beads harder than the metal particles that are being processed. The milling beads and metal particles can be suspended in an aliphatic oil, e.g., Isopar® fluids from Exxon, USA, mineral oil, paraffin oil, decane, undecane, dodecane, tridecane, etc. Other oils such as silicon oil can also be used. A milling speed of 400 RPM to 1000 RPM can be used for a relatively short period of time, e.g., 10 minutes to 24 hours. Other milling protocols can be used, provided they introduce structural defects to an outer volume of the metal particles as prescribed herein without damaging an inner portion of the metal particles so that they retain some physical integrity. Other milling bead (or ball) sizes that can be used include from 100 µm to 400 µm, or from 150 µm to 300 µm, for example. Other time frames that can be used can be from 10 minutes to 5 hours, from 20 minutes to 5 hours, from 1 hour to 5 hours, from 10 minutes to 3 hours, from 20 minutes to 2 hours, etc. Other RPM speeds that can be used include from 400 RPM to 800 RPM, from 500 RPM to 1000 RPM, from 500 RPM to 800 RPM, etc. Weight ratios of bead to metal particles can be varied based on the specific metals and beads selected for use.

High energy ball milling can be carried out that is too vigorous to prepare the metal particles described herein. For example, ball milling that results in the formation of nanocrystalline material goes beyond the surface treatment contemplated in accordance with the present disclosure. When virgin metal particles, such as stainless-steel or some of the other metal powders described herein, are subjected to high energy ball milling for a relatively short duration of time e.g., 10 minutes to 24 hours or from 1 h to 5 h (depending on the hardness of the metal being milled), the resulting metal particles formed can exhibit introduced surface plastic deformations, or deformations that are not elastic and do not typically return to their original shape. Severe plastic deformation, as can occur with this process, can lead to lattice strain associated with a high surface dislocation density and corresponding increase of the surface grains without an effect (or significant effect) on the integrity of an inner portion or core of the metal particles. Thus, the defective lattice structure at the surface can possess a high amount of stored energy, which can provide an easier path for atomic diffusion, as exemplified hereinafter by example and as shown in FIGS. 6A through 6D. As mentioned, ball milling of metal particles is traditionally carried out to produce fully nanocrystalline powders. In accordance with the present disclosure, the milling may still be high energy milling, but one or more of the milling parameters can be modified (for example, shortened milling time, reduced RPM, lower milling media mass, etc.) to activate the surface with an inner portion or core that remains intact for providing structural integrity when the metal particles are used, e.g., for three-dimensional printing.

Figure 2:
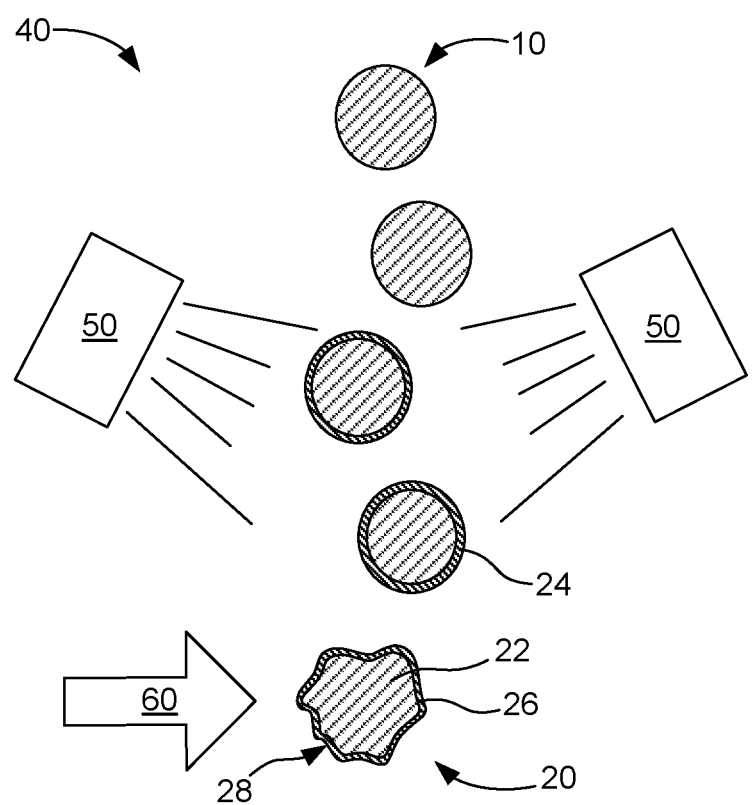
FIG. 2 schematically depicts an example effect of flash heating on small metal particles when exposed to pulsed light energy followed by rapid cooling in accordance with the present disclosure.

In other examples, flash heating (or application of pulse energy) can be used to introduce the structural defects to the outer volume of the metal particles, generating surface-activated metal particles. One example of this process is shown at 40 schematically in FIG. 2, where virgin metal particles 10 are exposed to pulsed energy from a flash heating source 50. This can generate a momentary molten surface that can be rapidly gas quenched 60, e.g., helium, argon, nitrogen, neon, etc., to leave a highly defective surface (i.e., a surface with structural defects 28) at an outer portion 26 of the metal particle 10 relative to an inner portion 22 thereof. The pulse energy that may be used may be as little as a single pulse, or can be from 1 to 10 pulses, or from 2 to 10 pulses, for example. The rapid cooling can generate more grains or a higher average surface grain density within the solidifying region than may occur in the case when metal particles with molten surface volumes may be cooled more slowly. In one example, rapid cooling can be from 100 microseconds to 5000 microseconds, from 500 microseconds to 2000 microseconds, from 600 microseconds to 800 microseconds, etc. The presence of the inert gas during the cooling/quenching process can prevent the metal particles from oxidizing, in some examples. The metal particles can be treated by placing them on a ceramic surface and irradiating them with the pulse energy, such as from a xenon lamp. On the other hand, and as shown by example in FIG. 2, the irradiation process can include the use of multiple xenon lamps (two or more) to focus on an irradiation region where the metal particles are dropped therethrough under gravity, for example. When the particles are flashed with a high energy lamp while falling through the irradiation region, the flashed energy can instantaneously (or very rapidly) heat the exposed surface (including a shallow depth or volume thereof) up to or above its melting temperature. The high-temperature gradient at the surface of the particle can cause rapid quenching and formation of a large number of small grains which do not have enough time to coalesce into a smaller number of larger grains. Rapid quenching can also lead to the formation of a partially amorphous metal particle structure. There can be other conceivable methodologies that could likewise be used.

Regardless of the method used to introduce the structural defects, in some specific examples, the structural defect depth of the metal particles can be up to about 5 µm, up to about 4 µm, up to about 3 µm, up to about 2 µm, up to about 1 µm, or up to about 0.5 µm. In some examples, the defect depths can be limited by the size of the metal particle being used. For example, the structural defect depth can be limited so that at least half of the particle size can be retained without the structural defects. To illustrate, a 4 µm metal particle can have a structural defect depth up to 1 µm, leaving a 2 µm inner portion intact, a 10 µm metal particle can have a structural defect depth up to 2.5 µm leaving a 5 µm inner portion intact, a 20 µm metal particle can have a structural defect depth up to 5 µm leaving a 10 µm inner portion intact, etc. As the defect depth may also have a total depth of up to about 5 µm, any particle size over about 20 µm can have any structural defect depth up to about 5 µm, for example. These ranges are provided by example, as in some instances, structural defects depths outside of these ranges can be prepared.

Figure 3:
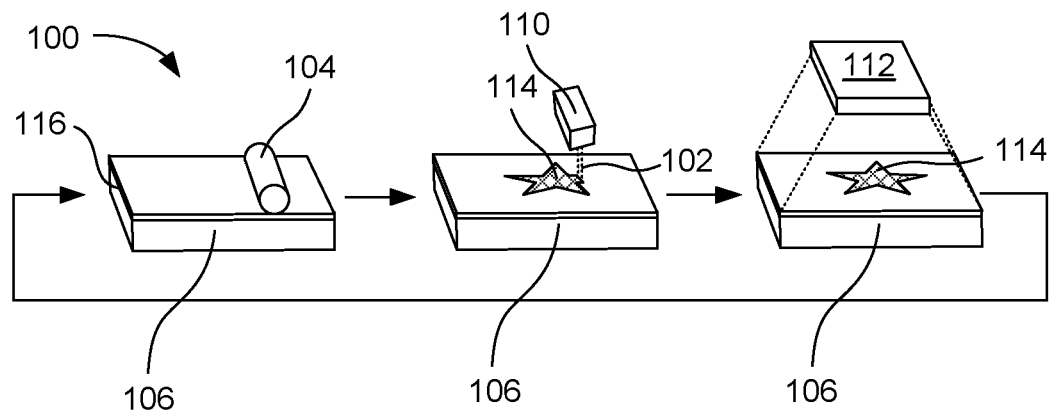
FIG. 3 schematically depicts an example isometric view of a system for three-dimensional printing in accordance with the present disclosure.

FIG. 3 depicts a three-dimensional printing system 100 that uses a powder bed material 106 including from 10 wt % to 100 wt % of the surface-activated metal particles as described herein, and a binder fluid 102 which is applied to the powder bed material on a layer by layer basis. More specifically, the powder bed material can be used to prepare three-dimensional green parts. To print a part, the powder bed material is layered as mentioned. During the printing of the (green) part, a new top layer 116 of powder bed material is applied to an existing substrate (either the build platform that supports the powder bed material 106, or previously deposited powder bed material 106, or previously generated green layer), and in this example, is flattened using a roller 104. The binder fluid 102, which is contained and ejected from a fluid ejector 110, such as a digital jetting pen, e.g. thermal fluid ejector, can then be applied to the top layer of the powder bed material 106 in a pattern 114 which corresponds to a layer of the three-dimensional object that is being built. In some examples, where applicable, the top layer of powder bed material 106 with the binder fluid 102 printed thereon (or within some or all of the top layer) can then be exposed to energy from an energy source 112 to cause the binder fluid 102 to bind the powder bed material 106 together at the pattern (and not outside of the printed pattern). In one example, the energy can be IR or UV energy suitable to initiate binder polymerization, flash heating energy from a pulsed light source, e.g., a xenon lamp, etc. As a note, in some examples, additional energy may be added, or in other examples, may not be added above the thermal energy that may already be present during printing, e.g., up to 200° C. The process can then be repeated to generate a three-dimensional green part or object that can be later heat fused in an oven or by some other heating technique.

Figure 4:
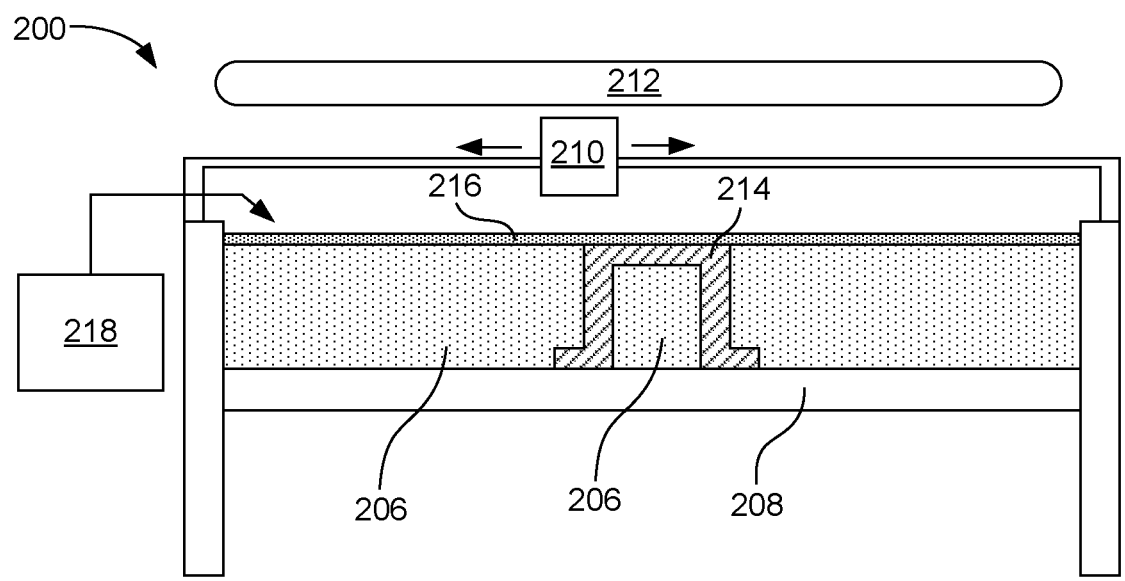
FIG. 4 schematically depicts an example cross-sectional view of an alternative system for three-dimensional printing in accordance with the present disclosure.

FIG. 4 illustrates schematically a related three-dimensional printing system 200 in accordance with examples of the present disclosure. In FIG. 4, the system can include a powder bed material 206 (of the surface-activated metal particles with structural defects introduced by milling, flash heating, etc.), a build platform 208, a fluid ejector 210, an energy source 212 for generating and applying energy to the powder bed material, e.g., after application of a binder fluid from the fluid ejector, and a powder material source 218 for supplying a new layer 216 of powder bed material for facilitating the build. In this example, the build platform 208 acts as the substrate for the first layer applied, and layers of powder bed material 206 and green part or object layer act as the substrate for subsequently applied powder bed material layers. Thus, the term "build platform" can refer to a rigid substrate that is used to support powder bed material 206 during the three-dimensional printing process. The build platform 208 can have side walls, for example, to retain the powder bed material 206, in one example. The more generic term "substrate," on the other hand, can refer to a build platform, powder bed material that may have already been deposited to the build platform, or any previously deposited powder bed material that has been bound together by the binder fluid to form a green layer of the green part or object that is being formed. In this example, for reference, a printed article 214 is also shown that can be printed using the present layer by layer printing process. As shown, the powder bed material 206 (either bound together using the binder fluid or as unprinted free flowing powder bed material) can sequentially support new layers during the build process. The powder bed material 206 can be spread as a 25 µm to 400 µm layer of the powder bed material 206 in the powder bed. Then the fluid ejector 210 can eject a fluid over selected surface regions of the powder bed material 206, and then, in some instances, additional energy can be applied to heat or initiate a reaction at the powder bed material.

In further detail, regarding the binder fluid that may be present in the material set or printing methods described herein, any of a number of binders carried by a liquid vehicle for dispensing on the powder bed material can be used. The term "binder" includes material used to physically bind separate metal particles together or facilitate adhesion to a surface of adjacent metal particles to a green part or object in preparation for subsequent sintering or annealing. The binder fluid can provide binding to the powder bed material upon application, or in some instances, can be further treated after printing to provide binding properties, e.g., exposure to IR energy to evaporate volatile species, exposure to flash heating (photo energy and heat) to activate a reducing agent, exposure to UV or IR energy to initiate polymerization, etc. A "green" part or object (or individual layer) refers to any component or mixture of components that is not yet sintered or annealed. Once the green part or object is sintered or annealed, the part or object can be referred to as a "brown" object or part. "Sintering" refers to the consolidation and physical bonding of the metallic particles together (after temporary binding using the binder fluid) by solid state diffusion bonding, partial melting of one or more phases or metal particles present, or a combination of solid state diffusion bonding and partial melting. The term "anneal" refers to a heating and cooling sequence that controls not only the heating process, but the cooling process, e.g., slowing cooling in some instances, to remove internal stresses and/or toughen the sintered part or object (or "brown" part) prepared in accordance with examples of the present disclosure. Furthermore, for some surface-activated metal particles, the structural defects can be introduced so that the presence of polymeric binder can be eliminated altogether. In other words, the binder fluid in some examples can be free of polymeric binder.

With more specific reference to the various types of binder fluid that can be used, in one example, the binder fluid can include a polymeric binder that provides the binding properties when ejected or printed onto the powder bed material. The polymer can be, for example, a latex polymer that is fluid-jettable from a fluid ejector, such as a piezo or thermal inkjet pen. Example latex polymer particle size can be from 10 nm to 200 nm, and the concentration of the latex particles in the binder fluid can be from 0.5 wt % to 20 wt %, for example. Other binder fluids may include prepolymer material that may be polymerized after ejection onto the powder bed material. In one example, the binder fluid may include water soluble acrylate- or methacrylate-based monomer carried by an aqueous liquid vehicle. For example, a binder fluid may include a monofunctional acrylate- or methacrylate-based monomer, a water soluble difunctional acrylate- or methacrylate-based monomer, an amine, and water. For example, the monofunctional monomer can be 2-hydroxy ethyl methacrylate (IEEMA) or other similar monomer, and the difunctional monomer can be glycerol dimethacrylate or other similar monomer. An example amine that can be used is N,N-dimethyl-4-ethyl benzoate or other similar amine compound. In some examples, an initiator can be present, such as a photoinitiator (e.g. UV or IR) for initiating the reaction of the various monomers and amines, etc., during layer by layer binder fluid deposition. Other polymers that may be suitable for use in the binder fluid can include poly(meth)acrylates, polyvinyl alcohols, polyvinyl acetates, polyvinyl pyrrolidones, polyvinyl butyrals, etc. Organo-metallic polymers, polysilanes, polycarbosilanes, polysilazanes, waxes, or other similar binder material can also be formulated into the binder fluids of the present disclosure. With polymeric binder fluids, typically, the binder contained therein can undergo a burnout process where the polymer essentially burns off during the sintering or annealing process. The term "burnout" refers to thermal binder burnout where thermal energy to a green part or object removes inorganic or organic volatiles and/or other materials that may be present. Burnout may result in some or all of the non-metal material to be removed. In some systems, burnout may not occur, such as in the instance where the binder is a metal oxide and the reducing agent is consumed in the redox-reaction.

In further detail, regarding the binder fluid, it is notable that there can be multiple binder fluids used in some examples, and/or the binder fluid can include more than one binder material. With multiple binder fluids, the various types of binders carried by the multiple binder fluids, respectively, can be selected to provide multistep binding. For example, a first binder may melt and bind within a relative low temperature range, and as the temperature rises and the first binder fails, the second binder may then melt and start to contribute to the binding within a second range of temperatures, and so forth, e.g., two binders, three binders, four binders, etc. In the present disclosure, even if the highest melting temperature binder were to fail before the surface-activated metal particle were to reach sintering temperatures, the structural defects (and easier path for atomic diffusion that may be present) can close the temperature gap between the highest binder melting temperature and the sintering temperature where connection bridges begin to form.

In other examples, binder fluids may be prepared that do not rely on polymers for providing the binding properties prior to sintering. These systems can include some (reduced concentration) of polymer or can be devoid of polymer altogether. For example, the binder fluid can be a thermally sensitive binder fluid that includes an aqueous liquid vehicle, a reducible metal compound, and a thermally activated reducing agent. In this example, the water can be present at from 20 wt % to 95 wt %, from 30 wt % to 80 wt % water, or from 50 wt % to 80 wt %. The reducible metal compound can be present at from 2 wt % to 40 wt %, from 7 wt % to 30 wt %, or from 10 wt % to 35 wt %. The thermally activated reducing agent can be present at from 2 wt % to 40 wt %, from 7 wt % to 30 wt %, or from 10 wt % to 35 wt %.

In further detail, the reducible metal compound can be reduced by hydrogen released from the thermally activated reducing agent. Another possible mechanism can include the formation of radicals that attack the metal compound (e.g., metal oxide) and reduce it to a pure metal. Decomposition of the reactive agent can be very fast or instantaneous, driven by the high energy pulse (highly thermodynamically non-equilibrium process) and it may produce transient moieties capable of attacking the metal compounds. Examples of reducible metal compounds can include metal oxides (from one or more oxidation state), such as a copper oxide, e.g., copper I oxide or copper II oxide; an iron oxide, e.g., iron(II) oxide or iron(III) oxide; an aluminum oxide, a chromium oxide, e.g., chromium(IV) oxide; titanium oxide, a silver oxide, zinc oxide, etc. As a note, due to variable oxidation states of transition metals, they can form various oxides in different oxidation states, e.g., transition metals can form oxides of different oxidation states.

In other examples, the binder fluid can include organic or inorganic metal salts. In particular, inorganic metal salts that can be used include metal bromides, metal chlorides, metal nitrates, metal sulfates, metal nitrites, metal carbonates, or a combination thereof. Inorganic metal salts can include chromic acid, chrome sulfate, cobalt sulfate, potassium gold cyanide, potassium silver cyanide, copper cyanide, copper nitrate, copper sulfate, iron acetate, iron nitrate, nickel carbonate, nickel chloride, nickel fluoride, nickel nitrate, nickel sulfate, potassium hexahydroxy stannate, sodium hexahydroxy stannate, silver cyanide, silver ethansulfonate, silver nitrate, sodium zincate, stannous chloride (or tin(II) chloride), stannous sulfate (or tin(II) sulfate, zinc chloride, zinc cyanide, tin methansulfonate, for example. In some instances, the reducible metal compound can be in the form of a nanoparticle, and in other instances, the reducible metal compound can be disassociated or dissolved in the aqueous liquid vehicle, e.g., copper nitrate or copper chloride. As nanoparticles, the reducible metal compound can have a D50 particle size from 10 nm to 1 µm, from 15 nm to 750 nm, or from 20 nm to 400 nm. In some instances, small nanoparticles can be used, such as those from 10 nm to 200 nm. Thermally sensitive binder fluids can be digitally ejectable from a fluid ejector with reliability, such as a piezoelectric fluid ejector or even a thermal fluid ejector in some examples.

The reducing agent can be particularly sensitive to rapidly applied elevated temperatures and may also be activated by a photochemical reaction introduced by flash heating. The term "flash" heating (or fusion) or application of "pulse energy" refers to raising a temperature of a surface layer of a powder bed material using photo energy while in contact with a binder fluid printed thereon (or therein) in a duration of few (or less) milliseconds. Flash heating can be tuned, for example, to have little to no impact on the already applied underlying green layer or powder bed material of the printed object, except in some instances perhaps to assist in adhering a newly formed layer to the subsequently applied and flash heated layer. Flash heating can, in other examples, have some impact on lower layers, depending on the material and the layer thickness. Example pulse energies that can be irradiated by a flash or pulse light source, particularly when the binder includes a reducible metal compound and a reducing agent, can be from 15 J/cm$^2$ to 50 J/cm$^2$ (positioned from 5 mm to 150 mm away from the powder bed material), or from 20 J/cm$^2$ to 40 J/cm$^2$. For example, the light source can be a non-coherent light source such as a pulsed gas discharge lamp. In further detail, the light source can be a commercially available xenon pulse lamp. The light source can alternatively be capable of emitting a pulse energy at an energy level(s) from 20 J/cm$^2$ to 45 J/cm$^2$. In other examples the light source can be positioned at from 25 mm to 125 mm, 75 mm to 150 mm, 30 mm to 70 mm, or 10 mm to 20 mm away from the powder bed material during operation. It should also be noted that pulsing the light energy (or flash heating) can be based on a single pulse or repeated pulses as may be designed for a specific application or material set to advance the binding properties of the printed binder fluid, e.g., initiate polymerization, initiate redox reaction. To illustrate, a higher energy single pulse may be enough to cause a fast-redox reaction to occur, or multiple lower energy pulses can likewise be used if a slower redox reaction may be desired (per layer), e.g., from 2 to 1000 pulses, from 2 to 100 pulses, from 2 to 20 pulses, from 5 to 1000 pulses, from 5 to 100 pulses, etc.

Example thermally activated reducing agents can include hydrogen ($H_2$), lithium aluminum hydride, sodium borohydride, a borane (e.g., diborane, catecholborane, etc.) sodium hydrosulfite, hydrazine, a hindered amine, 2-pyrrolidone, ascorbic acid, a reducing sugar (e.g., a monosaccharide), diisobutylaluminium hydride, formic acid, formaldehyde, or mixtures thereof. The choice of reducing agent can be such that it is thermally activated as may be dictated by the choice of the thermally reducible metal compound, e.g. to keep the metal oxide or salt primarily in its native or original state (as an oxide or salt) until their reaction with the reducing agent is desired at the elevated temperatures described herein, e.g., at flash heating. If the reducing agent and the metal oxide or salt is too reactive, e.g., at room temperature, the reducible metal compound (oxide or salt) can become reduced prematurely in the binder fluid leaving behind reduced metal nanoparticles that could easily degrade by contact with air/moisture.

In this specific example, the binder fluid of this type, if used, can be referred to as a "thermally sensitive" binder fluid, meaning the metal oxide or salt is not reduced until printed in a powder bed material and then exposed to rapid heat increases by flash heating. That being stated, some polymers in binder fluids can also be thermally sensitive, in that they melt above application temperature to provide binding properties. Thus, flash heating can be used for thermally sensitive and/or photoreactive binder fluids that include polymeric binder as well. If using flash heating for causing a reducing agent to react with a reducible metal compound, e.g., metal oxide, the powder bed material having the binder fluid printed to a layer thereof can be exposed to high temperatures, such as an essentially instantaneous high reaction temperature, e.g., from 200° C. to 1000° C., from 250° C. to 1000° C., from 300° C. to 700° C., etc. Polymer binders can be exposed to these types of temperatures as well, but in some examples, lower temperature ranges with lower limits can be used as well, e.g., from 80° C. to 600° C., from 100° C. to 500° C., from 200° C. to 400° C., etc. With the binder fluids that include polymer binder, other methods of heating can be used, as in some cases, the temperatures may be lower and more easily raised to applicable softening and/or melting temperatures. Regardless, if using flash heating, raising the temperature rapidly can accelerate melting and/or redox-reaction that may occur to cause binding of powder bed material to occur.

Flash heating (using a flash pulse power source, for example) can generate high temperatures with efficiency, as a flash heating process can be tuned to facilitate heating to any temperature above room temperature up to even a melting temperature of many metals. That being mentioned, reducing the reducible metal compound in the presence of a thermally sensitive reducing agent can be carried out at a temperature well below the melting temperature of the metal, thus providing metal binder to join or adhere powder bed metal particles together in a sufficiently strong manner to allow for further processing, e.g., oven heating, sintering, annealing, etc.

In further detail, in order to generate three-dimensional printed parts, such as green parts or finished heat fused parts, three-dimensional powder-bed printing can be carried out a layer at a time. To illustrate, a layer of the powder bed material can be deposited and spread out evenly on a substrate, e.g., a build platform, a previously applied layer of powder bed material, or a previously formed green layer, typically evenly at the top surface. The layer of powder bed material can be from 25 μm to 400 μm, from 75 μm to 400 μm, from 100 μm to 400 μm, 150 μm to 350 μm, or from 200 μm to 350 μm, for example. The thickness of the layer can be determined in part based on the powder bed material particle size or particle size distribution, e.g., D50 particle size, etc., and/or upon the desired resolution of the printed part, and/or the amount of binder fluid applied to (or into) an uppermost layer of the powder bed material. Next, the binder fluid can then be selectively printed on a portion of the powder bed material in a desired pattern corresponding to a layer of the three-dimensional part or object to be printed. This can be carried out at a relatively low temperature (temperature typically below 200° C.). Notably, elevated temperature can provide some removal (evaporation) of volatile liquid components of the binder fluid, e.g., elevated above about 100° C. Next, the powder bed material layer printed with binder fluid, in some instances, can be processed further, e.g., exposed to UV or IR energy to initiate polymerization, flash heated by exposing to a pulse of light or optical energy to initiate polymerization or initiate a redox-reaction, etc. Once the three-dimensional green part or object is formed, the green part or object can be transferred or otherwise heated in a more traditional oven, such as an annealing oven or a sintering oven. There, the metal particles of the powder bed material (bound together with one or more of the various binders or binder systems, e.g., binder fluid with energy input, etc.) can become sintered together, or otherwise form a more permanent structure or rigid metal part or object (or "brown" part) compared to the green part. In the sintering or annealing oven, volatile byproducts not already removed during printing, e.g., typically below 200° C., may be further removed as the temperature increases.

Figure 5:
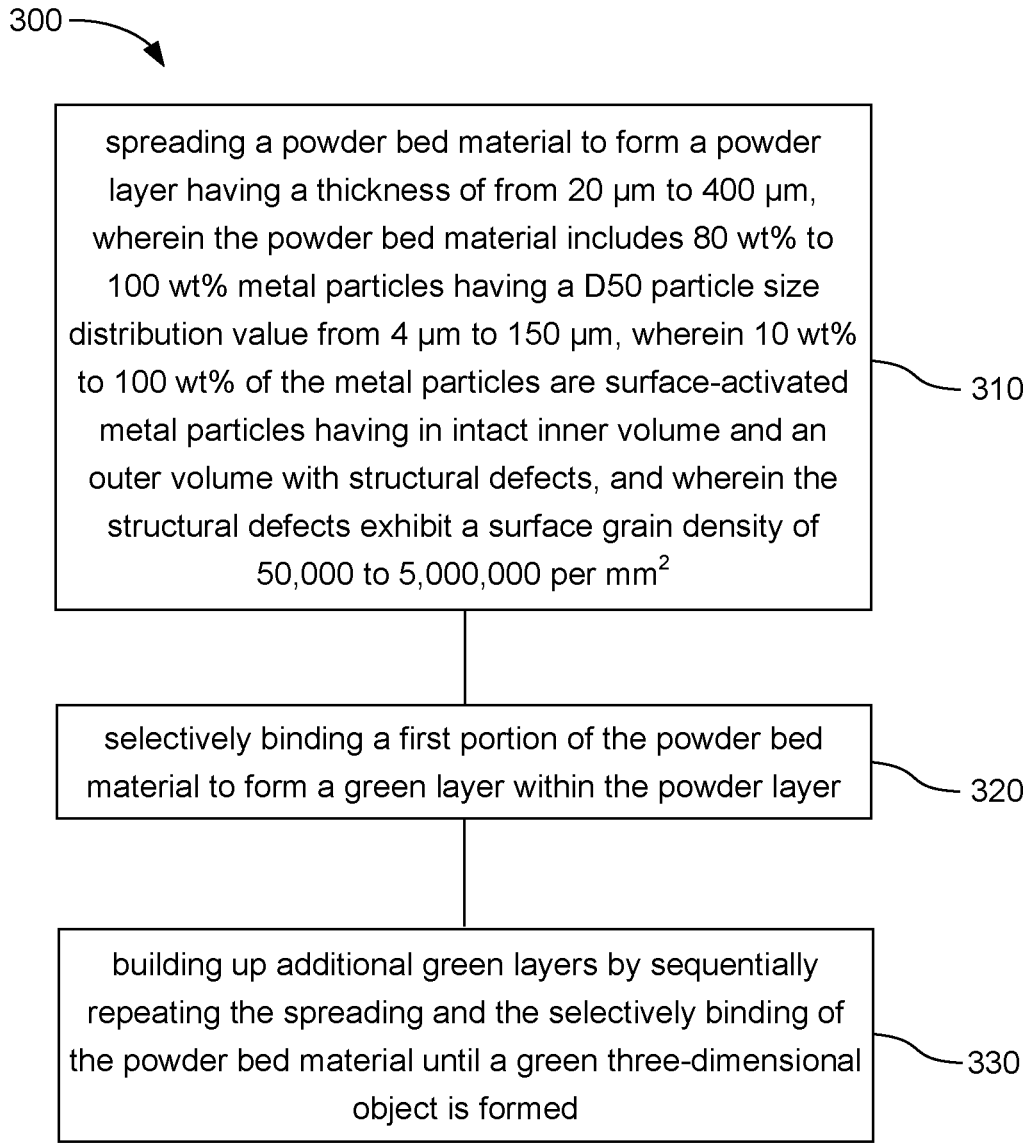
FIG. 5 is a flow diagram of an example method of three-dimensional printing in accordance with the present disclosure.

FIG. 5 depicts a method of three-dimensional printing 300, which can include spreading 310 a powder bed material to form a powder layer having a thickness of from 20 μm to 400 μm. The powder bed material can include 80 wt % to 100 wt % metal particles having a D50 particle size distribution value from 4 μm to 150 μm. From 10 wt % to 100 wt % of the metal particles can be surface-activated metal particles having in intact inner volume and an outer volume with structural defects exhibiting a surface grain density of 50,000 to 5,000,000 per mm$^2$. The method can further include selectively binding 320 a first portion of the powder bed material to form a green layer within the powder layer, and building up 330 additional green layers by sequentially repeating the spreading and the selectively binding of the powder bed material until a green three-dimensional object is formed.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, "aspect ratio" refers to an average of the aspect ratio of the collective particles as measured on the individual particle by the longest dimension in one direction and the longest dimension in a perpendicular direction to the measured dimension.

"Particle size" refers to the diameter of spherical particles, or to the longest dimension of non-spherical particles. When the metal particle is not spherical or is asymmetrical, the longest dimension can also be used to establish the relative size of the inner volume relative to the depth of defects in the outer volume.

As used herein, "first" and "second" are not intended to denote order. These terms are utilized to distinguish an element, component, or composition from another element, component, or composition. Thus, the term "second" does not infer that there is a "first" within the same compound or composition, but rather it is merely a "second" element, compound, or composition relative to the "first."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate several alternatives in accordance with the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparing and Sintering Surface-Activated Metal Particles by Milling

Figure 6A:
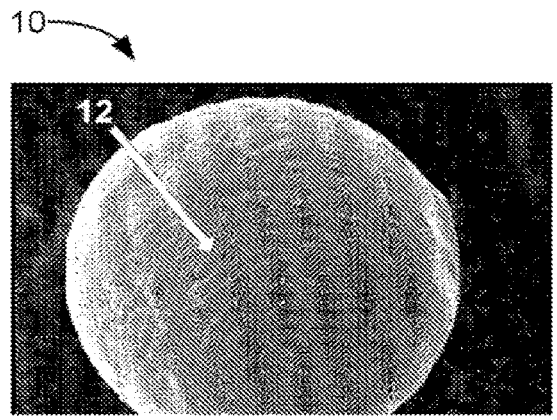
FIGS. 6A through 6D provide a series of example Scanning Electron Microscope (SEM) images comparing surface-activated metal particles and untreated metal particles relative to the effectiveness of the formation of connection bridges between adjacent metal particles with application of heat below the melting temperature of the metal particle material in accordance with the present disclosure.
Figure 6B:
Figure 6C:
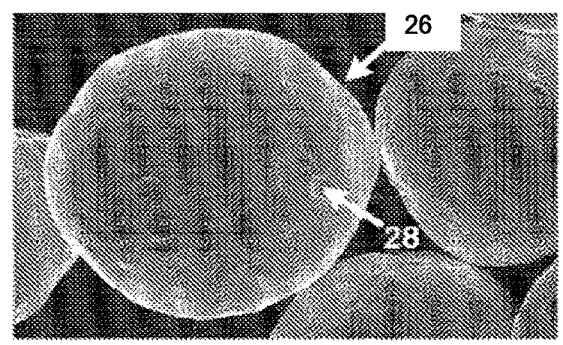
Figure 6D:
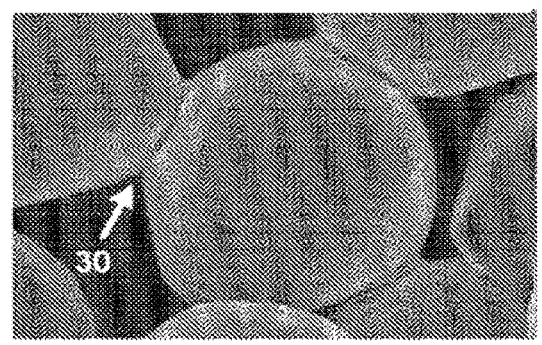

Virgin stainless-steel metal particles were compared with ball-milled stainless-steel particles to determine relative sintering and heat fusing behavior relative to one another. FIG. 6A provides an example SEM image of a virgin stainless-steel metal particle 10 before sintering the particles at 1000° C. for 30 minutes in argon gas. FIG. 6B provides an example SEM image of the virgin stainless-steel metal particle 10 after sintering. Virgin stainless-steel metal particles can be identified as including dendrites 12, which are branch like structures often formed on the surface stainless-steel balls that have not been surface modified. As can be seen, after sintering at this temperature (which is about 550° C. below the melting temperature of stainless-steel), the steel balls were not able to form connection bridges between adjacent metal particles (30 shown in FIG. 6B). FIG. 6C also provides SEM images of ball-milled stainless-steel metal particles 20 before sintering at the same temperature and time frame. FIG. 6D provides SEM images of the ball-milled stainless-steel metal particles 20 after sintering. As can be seen in the before image (20 shown at A), the dendrites are not discernable on the outer portion 26 of the ball-milled metal particles and structural defects 28 (activation) are now visible in the SEM image. A comparison of the stainless-steel balls after exposure to 1000° C. for 30 minutes reveals that the metal particles that were ball-milled formed connection bridges 30 and the virgin metal particles that were not ball milled formed no connection bridges. Thus, during sintering, the surface-activated stainless-steel particles seem to provide faster atomic diffusion rates even at lower temperatures (below the melting temperature of stainless-steel). This can lead to the early formation of connection bridges or "necks" between metal particles, which can provide faster and/or earlier brown part densification.

Figure 7:
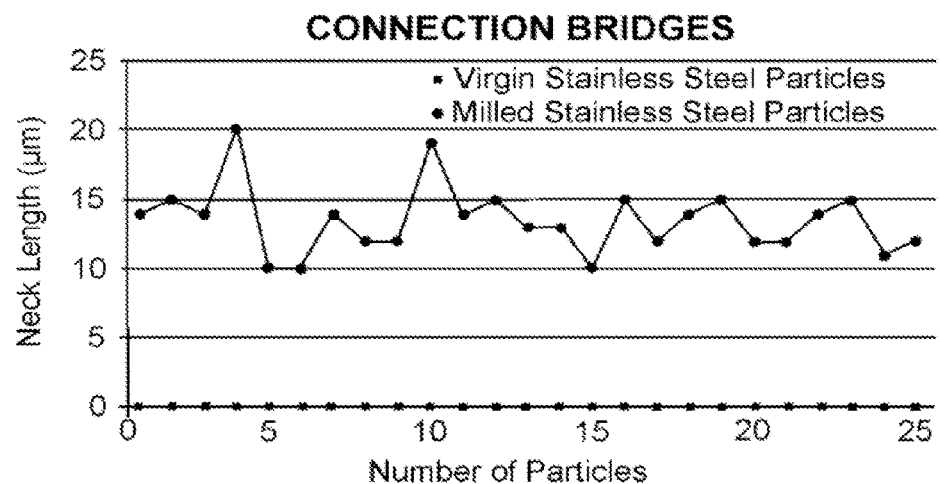
FIG. 7 is an example graph comparing the number of connective bridges formed with surface-treated metal particles compared to metal particles that remained untreated when heated at the same temperature (below the melting temperature of the metal particle material) for the same duration of time.

FIG. 7 provides data comparing the number of connection bridges that were formed on a particle by particle basis. As can be seen in the connection bridge graph shown in this FIG., at 1000° C. for 30 minutes in an argon gas environment, the virgin stainless-steel particles did not form any connection bridges between adjacent particles, whereas with the milled stainless-steel particles, a large number of connection bridges were formed.

Example 2—Preparing Surface-Activated Metal Particles by Flash Heating

Figure 8:
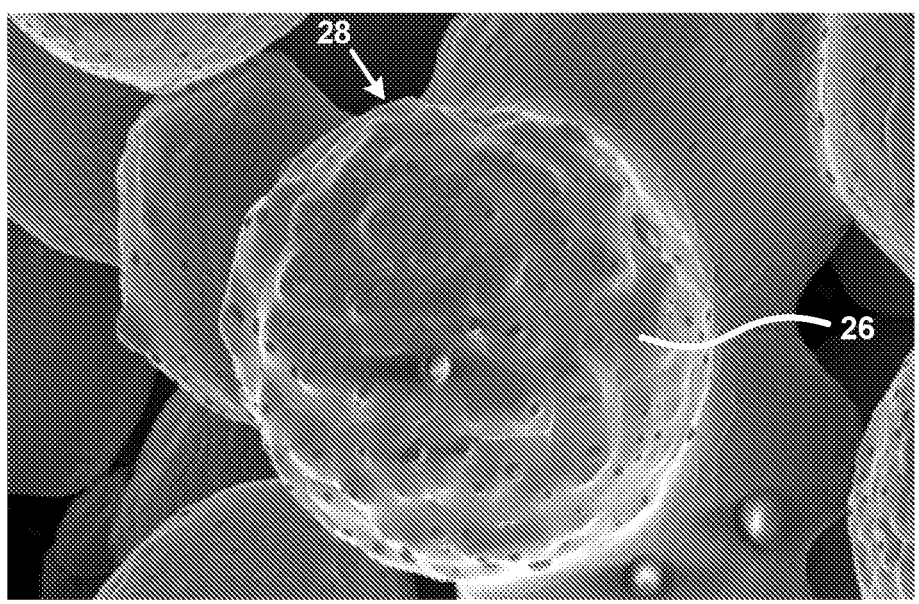
FIG. 8 is an example SEM image of a metal particle that has been exposed to flash heating using pulsed light energy in accordance with the present disclosure.

Stainless-steel metal particles are flash heated by applying the metal particles on a ceramic plate and applying a single pulse (30 J/cm$^2$) of flash energy, or by suspending the metal particles in a medium and applying multiple pulses (25 to 30 J/cm$^2$) of flash energy to the particles. The flash energy or flash heating is applied using a high-intensity xenon lamp. An example of a stainless-steel metal particle that has been irradiated by pulse energy is shown in FIG. 8, where a clear contrast with respect to structural defects can be observed compared to the virgin stainless-steel shown in FIG. 4 (virgin stainless-steel metal particle shown at 10, image A). Metal particles having a high average surface grain density and associated increased number of structural defects (dislocation, voids, inclusion, etc.) can be capable of faster formation of connection bridges at lower temperatures between the adjacent metal particles during the sintering or annealing process.

Example 2—Binder Fluid

An acrylic latex binder fluid is prepared that includes from 10 wt % to 20 wt % acrylic latex binder particles and a liquid vehicle which is predominantly water and other volatiles. This acrylic latex binder fluid is ejectable from a thermal fluid ejector onto powder bed material.

Example 3—Three-Dimensional Printing

A powder bed material of 100 wt % milled stainless-steel particles prepared in accordance with Example 1 are spread on a substrate and the acrylic latex binder fluid of Example 2 is printed thereon to form a green part or object layer. Powder bed spreading and acrylic latex binder printing is repeated until a green part or object is formed. The green part or object is removed from the powder bed container and transferred to annealing furnace. The furnace temperature was gradually raised to accommodate first aqueous solvent evaporation (around 100° C. to 150° C.), then melting of the latex binder (around 140° C. to 250° C.). Further temperature increase from 250° C. to 400° C. (in presence of an oxidizing ambient, then a reducing ambient) accommodates gradual latex burnout and removal of volatile byproducts that are present in the liquid vehicle. Sintering and the formation of connection bridges occurs well below the melting temperature of virgin stainless-steel. The green part is thus converted to a brown part well below the melting temperature of stainless-steel.

What is claimed is:

1. A powder bed material, comprising:
   80 wt % to 100 wt % metal particles having a D50 particle size distribution value from 4 μm to 150 μm,
      wherein 10 wt % to 90 wt % of the metal particles have an average surface grain density of 20,000 per mm$^2$ or less, and
      wherein 10 wt % to 90 wt % of the metal particles are surface-activated to have an outer volume with increased structural defects compared to an inner volume and an average surface grain density of from 60,000 per mm$^2$ to 120,000 per mm$^2$.

2. The powder bed material of claim 1, wherein the metal particles are elemental metals or alloys of aluminum, titanium, copper, cobalt, chromium, nickel, vanadium, tungsten, tantalum, molybdenum, magnesium, gold, silver, iron, stainless-steel, steel, or an admixture thereof.

3. The powder bed material of claim 1, wherein the structural defects are introduced by flash heating the metal particles with from 1 to 10 pulses of light energy at from 15 J/cm$^2$ to 50 J/cm$^2$.

4. The powder bed material of claim 1, wherein the metal particles having an average surface grain density of 20,000 per mm$^2$ or less are made of the same metal as the surface-activated metal particles.

5. The powder bed material of claim 1, wherein 80 wt % to 90 wt % of the metal particles are surface activated metal particles.

6. The powder bed material of claim 1, wherein the D50 particle size distribution value of the metal particles ranges from 20 μm to 100 μm.

7. The powder bed material of claim 1, wherein the metal particles that are surface activated are flash-heated metal particles.

8. The powder bed material of claim 5, wherein a balance of the metal particles has the average surface grain density of 20,000 per mm$^2$ or less.

9. A material set, comprising:
   a powder bed material comprising 80 wt % to 100 wt % metal particles having a D50 particle size distribution value from 4 μm to 150 μm,
      wherein 10 wt % to 90 wt % of the metal particles have an average surface grain density of 20,000 per mm$^2$ or less, and
      wherein 10 wt % to 90 wt % of the metal particles are surface-activated metal particles having an intact inner volume and an outer volume with increased structural defects compared to the inner volume and an average surface grain density of from 60,000 per mm$^2$ to 120,000 per mm$^2$; and
   a binder fluid to adhere a first portion of the powder bed material relative to a second portion of the powder bed material not in contact with the binder fluid.

10. The material set of claim 9, wherein the binder fluid includes water and a polymer binder or a polymerizable binder.

11. The material set of claim 9, wherein the binder fluid is stable at room temperature and includes water, dispersed metal oxide nanoparticles, and a reducing agent to reduce the dispersed metal oxide nanoparticles when heat is applied to the binder fluid.

12. The material set of claim 9, wherein the structural defects are introduced by flash heating the metal particles with from 1 to 10 pulses of light energy at from 15 J/cm$^2$ to 50 J/cm$^2$.

13. A method of three-dimensional printing, comprising:
   spreading a powder bed material to form a powder layer having a thickness of from 20 μm to 400 μm, wherein the powder bed material includes 80 wt % to 100 wt % metal particles having a D50 particle size distribution value from 4 μm to 150 μm,
      wherein 10 wt % to 90 wt % of the metal particles have an average surface grain density of 20,000 per mm$^2$ or less, and
      wherein 10 wt % to 90 wt % of the metal particles are surface-activated metal particles having an intact inner volume and an outer volume with increased structural defects compared to the inner volume and an average surface grain density of from 60,000 per mm$^2$ to 120,000 per mm$^2$; and
   selectively binding a first portion of the powder bed material to form a green layer within the powder layer; and
   building up additional green layers by sequentially repeating the spreading and the selectively binding of the powder bed material until a green three-dimensional object is formed.

14. The method of claim 13, further comprising heat fusing the green three-dimensional object to sinter or anneal the metal particles together.

15. The method of claim 14, wherein the heat fusing starts at a temperature from 0.6 to 0.8 of the melting temperature of the metal particles.

16. A powder bed material, comprising:
   80 wt % to 100 wt % metal particles having a D50 particle size distribution value from 4 μm to 150 μm,
      wherein 80 wt % to 99 wt % of the metal particles are surface-activated to have an outer volume with increased structural defects compared to an inner volume and a surface grain density of from 50,000 per mm$^2$ to 5,000,000 per mm$^2$, and wherein a balance of the metal particles have an average surface grain density of 20,000 per mm$^2$ or less.

17. The powder bed material of claim 16, wherein the metal particles are elemental metals or alloys of aluminum, titanium, copper, cobalt, chromium, nickel, vanadium, tungsten, tantalum, molybdenum, magnesium, gold, silver, iron, stainless-steel, steel, or an admixture thereof.

18. The powder bed material of claim 16, wherein the D50 particle size distribution value of the metal particles ranges from 20 μm to 100 μm.

19. The powder bed material of claim 16, wherein the metal particles that are surface activated are flash-heated metal particles or ball-milled metal particles.

* * * * *